C. OLSEN.
FRUIT PICKER.
APPLICATION FILED JUNE 7, 1911.
1,038,425.
Patented Sept. 10, 1912.
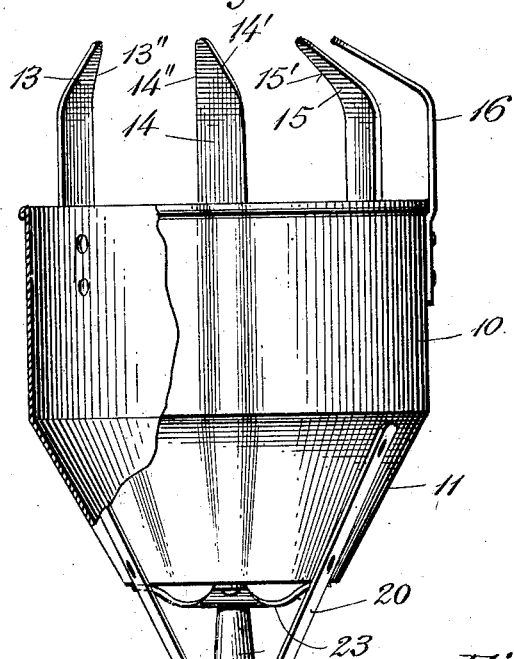
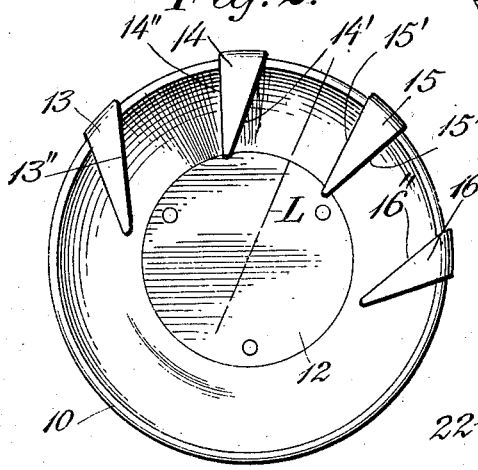
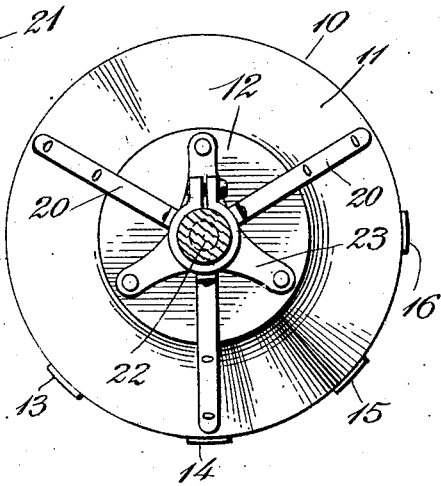
WITNESSES:
INVENTOR.
Christian Olsen,
BY
ATTORNEY.

UNITED STATES PATENT OFFICE.

CHRISTIAN OLSEN, OF SOLDIER, IOWA.

FRUIT-PICKER.

1,038,425.  Specification of Letters Patent.  Patented Sept. 10, 1912.

Application filed June 7, 1911. Serial No. 631,779.

*To all whom it may concern:*

Be it known that I, CHRISTIAN OLSEN, a citizen of the United States of America, residing at Soldier, in the county of Monona and State of Iowa, have invented certain new and useful Improvements in Fruit-Pickers, of which the following is a specification, reference being had therein to the accompanying drawings.

This invention relates to fruit pickers, and it has for its object the provision of an improved device of this character which may be attached to the end of a pole and is provided with peculiarly shaped fingers whereby fruit may be pulled from the branch of a tree and drop into a cup or similar receptacle without danger of bruising.

The invention has been clearly illustrated in the accompanying drawings, in which similar characters denote similar parts, and in which—

Figure 1. is a side view of my improved device partly broken away. Fig. 2. represents a top view thereof, and Fig. 3. is a bottom view thereof.

Referring to the drawings, 10 denotes a basket or similar receptacle preferably made of sheet metal and having a cone-shaped bottom portion 11, which is closed by a plate 12. Secured to the outer surface of the cylindrical part of the basket 10, are a series of fingers 13, 14, 15, 16, all disposed within one-half of the opening-area thereof so as to leave the other half unobstructed and consequently permit the device to be placed over the fruit hanging on the tree. A slight side-movement will then result in bringing the fingers in a position to straddle the branch or fruit-stem, and the fruit may then be pulled off and drop into the basket immediately below it.

It will be noted that the pair of adjacent central fingers 14, 15 are tapered so that their adjacent edges 14', 15' are substantially parallel with each other and also with a line L passing centrally between them and through the center of the basket. Likewise the adjacent edges 15" and 16" of the fingers 15 and 16 are substantially parallel, as well as the edges 14" and 13" of the first named set of fingers 13 and 14. This construction insures comparatively wide openings between the ends of the several fingers without increasing the space between them at their points of attachment to the basket as that fruit may be readily picked and the liability of its slipping through will be minimized. Secured to the conical bottom portion are a series of stays 20 which are attached with their lower ends to a split ring 21 adapted to receive the end portion of a pole 22, the end of which is preferably tapered as shown and seated in a foot-plate 23 secured to the bottom plate 12 above mentioned.

Many changes may be made in the particular construction of my improved device, without departing from the spirit of the invention.

I claim:—

The combination with a fruit-picker comprising a basket, and fingers attached to the outer surface and extending over the top thereof, of a series of stays secured to the outer surface of said basket, a ring connecting the lower ends of said stays, a foot plate secured to the bottom of said basket, and a pole passing through said ring and engaging said foot-plate.

In testimony whereof I affix my signature in presence of two witnesses.

CHRISTIAN OLSEN.

Witnesses:
D. B. SEVERSON,
HANS BERG.

Copies of this patent may be obtained for five cents each, by addressing the "Commissioner of Patents, Washington, D. C."